United States Patent [19]

Collette et al.

[11] Patent Number: 4,618,515

[45] Date of Patent: Oct. 21, 1986

[54] POLYESTER CONTAINER WITH ORIENTED, CRYSTALLIZED THREAD FINISH FOR HOT FILL APPLICATIONS AND METHOD OF MAKING SAME

[75] Inventors: Wayne N. Collette; Donald R. Demanche, both of Merrimack, N.H.

[73] Assignee: Continental PET Technologies, Inc., Stamford, Conn.

[21] Appl. No.: 720,504

[22] Filed: Apr. 5, 1985

[51] Int. Cl.⁴ .............................................. B29C 17/07
[52] U.S. Cl. ..................... 428/35; 215/1 C;
  264/520; 428/542.8; 428/910
[58] Field of Search ....................... 428/35, 542.8, 910;
  264/520, 521; 215/1 C

[56] References Cited

U.S. PATENT DOCUMENTS

| | | | |
|---|---|---|---|
| 4,379,099 | 4/1983 | Ota et al. ............................ | 264/25 |
| 4,466,845 | 8/1984 | Fortuna ............................. | 156/73.5 |
| 4,476,084 | 10/1984 | Takada et al. ...................... | 264/342 R |

Primary Examiner—John E. Kittle
Attorney, Agent, or Firm—Charles E. Brown

[57] ABSTRACT

This relates to the formation of wide mouth bottles and jars for receiving a hot fill product where the jars and bottles are formed of a suitable polyester such as PET. The bottle or jar is initially formed as part of an intermediate article including an upper adapter portion which is reusable so that substantially all of the resultant bottle and jar, particularly the neck finish thereof is biaxially oriented. The intermediate article is formed from a preform which is blow molded within a conventional type of blow mold. In the reheating of the preform, that portion of the preform which becomes the neck finish of the bottle or jar is heated to a higher temperature than the remainder of the preform and to a temperature wherein thermal crystallization in addition to strain crystallization occurs. This results in the neck finish having a higher density than other portions of the bottle or jar and being more resistant to shrinkage during hot filling.

18 Claims, 4 Drawing Figures

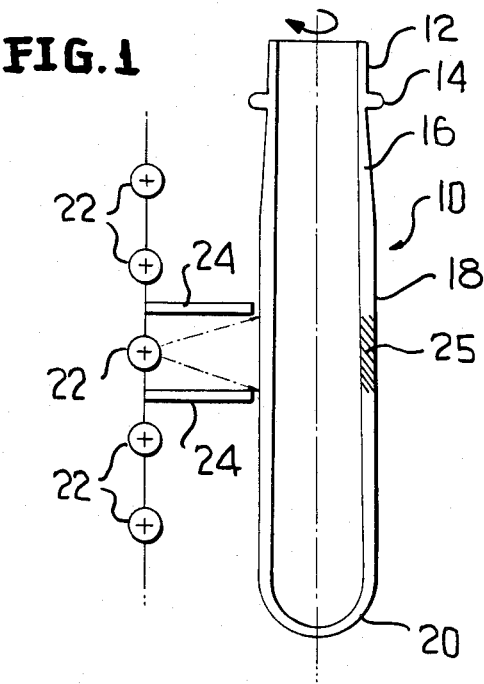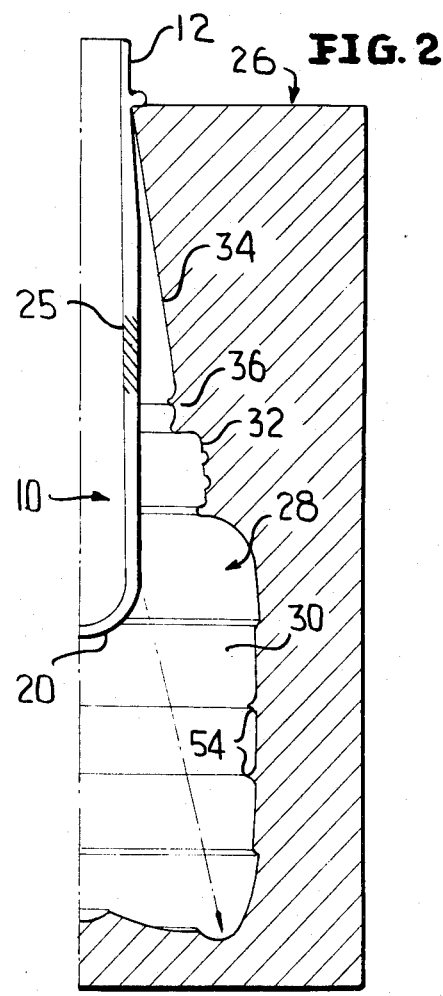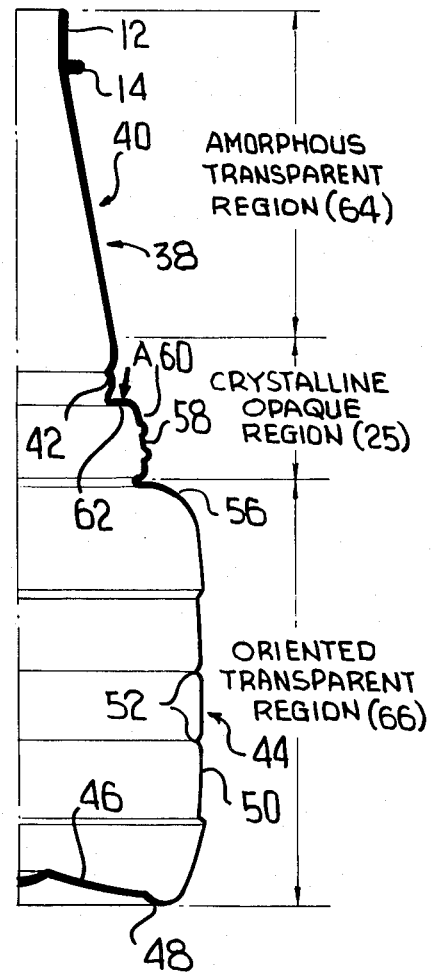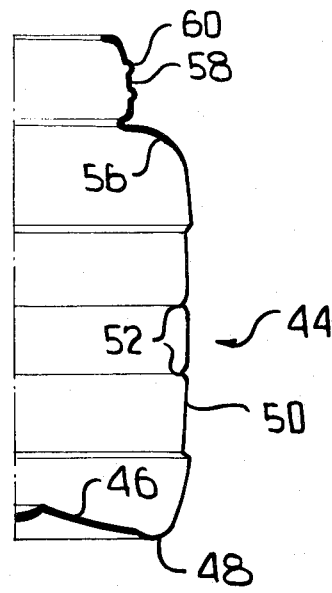

POLYESTER CONTAINER WITH ORIENTED, CRYSTALLIZED THREAD FINISH FOR HOT FILL APPLICATIONS AND METHOD OF MAKING SAME

This invention relates in general to new and useful improvements in polyester containers, and more particularly to a polyester container in the form of a wide mouth jar or bottle having a threaded neck finish for receiving a replaceable closure.

Most particularly, this invention relates to improving the thread finish dimensional stability of polyester containers when hot filled at temperatures up to and including 212° F.

There is currently being developed polyester containers utilizing a controlled and improved version of the forming method disclosed in Beck et al, U.S. Pat. No., 4,496,064 which will yield a wide mouth jar or bottle that exhibits a 4–6% volume loss when filled with a hot product at 212° F. In this particular container, major container diameters are reduced by 2–3% after hot filling. Shrinkage levels to this degree will be excessive in the thread finish area for many closures.

It has been taught by U.S. Pat. No. 4,375,422 that the thread finish of a preform may be purposely crystallized to raise the glass transition temperature (Tg) and thus the thermal distortion resistance of the thread finish of an essentially amorphous preform prior to reheat blow molding. However, in accordance with the teaching of this patent, the original finish of the preform becomes the final finish of the resultant container.

In accordance with this invention it is proposed, in the reheating of a previously formed preform as part of a blow molding process to apply sufficient heat to a preselected band of the preform body to provide a zone of semi-opaque crystallinity, which zone of semi-opaque crystallinity will be aligned with the neck finish of a resultant polyester container which is biaxially oriented in accordance with U.S. Pat. No. 4,496,064. The net result is a container neck finish which exhibits substantially less than 1% diameter change versus 2–3% diameter change in the body of such container. The 1% and less diameter change in the container finish has demonstrated effective capping and sealing performance.

With the above and other objects in view that will hereinafter appear, the nature of the invention will be more clearly understood by reference to the following detailed description, the appended claims, and the several views illustrated in the accompanying drawings.

FIG. 1 is a vertical sectional view taken through a typical preform utilized in conjunction with this invention and schematically shows the manner of heating the same.

FIG. 2 is a half sectional view taken through a blow mold formed in accordance with this invention and the heated preform of FIG. 1 positioned therein.

FIG. 3 is a half sectional view taken through an intermediate article formed by blow molding the preform of FIG. 1 in the blow mold of FIG. 2.

FIG. 4 is a half sectional view of a resultant container formed by serving the intermediate article of FIG. 3 generally as indicated by the arrow A, which container is the subject of this invention.

Referring now to the drawings in detail, reference is first made to FIG. 1 wherein there is illustrated a preform, generally identified by the numeral 10, of the type utilized in accordance with this invention. The preform 10 has an open upper neck portion 12 which terminates at a radially outwardly directed flange or shoulder portion 14 by which the preform is carried in a manner which does not form part of this invention. Below the flange 14 the preform 10 includes a portion 16 of increased thickness which terminates in a body portion 18. The lower end of the preform 10 is generally hemispherical as at 20.

Preforms, such as the preform 10, are generally heated by passing the same along a path which is normal to the plane of FIG. 1 and which is parallel to a plurality of heating elements. In FIG. 1, these heating elements are identified as quartz lamps 22. At least one of the quartz lamps 22 is positioned between shield elements 24, 26 which are vertically spaced and which are aligned with a zone 26 of the preform body 18. If desired, the quartz lamp between the shields 24 may be of a higher capacity than the other quartz lamp or there may be several such quartz lamps between the shields 24. In any event, the shields 24 serve to effect a heating of the preform 10 in a zone 26 to a temperature above that to which the remainder of the preform is heated. The zone 26 will be heated to the point where the zone 26 becomes a zone of semi-opaque crystallinity with the zone being purposely created at a specific site on the preform so that the zone, after stretch blowing of the preform, is specifically aligned with a portion of a special mold which is illustrated in FIG. 2 and will be described in detail at this time.

Referring now to FIG. 2, it will be seen that there is illustrated a typical blow mold 26 which will be formed in two halves and which define a mold cavity 28. The mold cavity 28 is particularly configured to define an intermediate article such as that illustrated in FIG. 3 and which will be described in more detail hereinafter.

It is to be understood that in the blow molding of the preform 10 within the mold cavity 28, conventional equipment will be utilized including a blow tube which will extend into the neck 12 of the preform 10 and be sealed relative thereto. Further, the equipment will normally include a stretch rod which will engage the bottom 20 of the preform serve to axially elongate the preform either in advance of the axial extension of the preform due to internal pressurization or during the same.

It is to be noted that the cavity 28 has a lower portion 30 to define a container and that an upper part 32 of the lower portion 30 defines a neck finish for the container. Above the upper part 32 the mold cavity 28 has a portion 34 which defines an adapter. If desired, immediately adjacent the upper part 32 the upper portion 34 may include a lower part 36 which is configured so as to form a general interlock between the resultant intermediate article and the service of the mold cavity 28.

Reference is now made to FIG. 3 wherein there is illustrated an intermediate article generally identified by the numeral 38. The intermediate article 38 was blow molded from the preform 10 in the mold cavity 28. The intermediate article 38 includes the neck 12 and flange 14 of the preform 10. These portions of the preform 10 have not been stretched in either the hoop direction or in an axial direction and remain constant from the condition of the preform.

Below the flange 14 the intermediate article 38 includes a tapered adapter portion 40 which progressively increases in diameter and is biaxially oriented to an increasing degree as it increases in diameter. If desired, the adapter 40 may have a lower part 42 of a configuration which will stiffen the same and which provides for an interlock with the mold 26.

The lower part of the intermediate article 38 is in the form of a container which is generally identified by the numeral 44. The container 44 includes a bottom wall 46 which has a radially outer base portion 48 joined to a resultant body 50. If desired, the body 50 may be provided with reinforcing beads 52 which preferably extend radially inwardly of the body 50 and are formed by beads 54 of the mold 26.

The body 50 terminates at an upper part thereof in a generally rounded shoulder 56 which, in turn, terminates in a neck finish 58. The neck finish 58 may be of the "threaded" type and include thread 60 as illustrated or thread elements or lugs of the conventional type. The neck finish 58 is joined to the lower portion 42 of the adapter 40 by a generally horizontal flange portion 62.

It is to be understood that the container 44, with the exception of a central portion of the body wall 46, is highly biaxially oriented. It will also be seen that the zone 25 of the preform 10 has become axially elongated and extends from the top of the shoulder portion 56 above the part 42 of the adapter 40.

As is schematically illustrated in FIG. 3, the upper part of the intermediate article 38 will include an amorphous transparent region (64), an intermediate crystalline opaque region (25) and a lower oriented transparent region (66).

The container 44 will be separated from the adapter 40 by cutting the flange 62 as indicated by the arrow A. This cutting is preferably effected by use of a laser which will be fixed while the adapter 38 is rotated.

The container 44, after being severed from the remainder of the intermediate article 38 appears in FIG. 4. As pointed out above, the entire container 44 will be biaxially oriented, with the exception of a central part of the bottom wall 46, and this biaxial orientation, together with other control features which are not the subject of this invention, will result in a polyester container (PET) wherein the density of the biaxially oriented (strain crystallized only) transparent region 66 will be generally below 1.36 grams/cc whereas the density of the thermal and strain crystallized finish region (25) will be substantially above 1.37 grams/cc. With respect to this, density as measured by ASTM 1.505 is a direct measure of percent crystallinity. Thus the oriented transparent region will have a crystallinity below 22% while the crystallized finish region will have a crystallinity above 30%.

Thus by having a high degree of biaxial orientation together with an increased density due to the increase in the crystallization thermally, the threaded neck finish 58 will have a much smaller degree of shrinkage when the container 44 is filled with a hot product at temperatures up to and including 212° F. As stated above, the shrinkage of the neck finish 58 will be no greater and generally substantially less than 1% whereas major diameters of the container 44 outside of the threaded neck finish area, will have a permissible shrinkage of 2-3% after hot filling. This great reduction in shrinkage of the neck finish 58 permits conventional closures to be applied to the container 44 after hot filling to provide the necessary seal and the necessary benefits of removal and replacement of conventional closures.

Although only a preferred embodiment of the container and the method of forming the same have been specifically illustrated and described herein, it is to be understood that the details of the container and the method of making the same may be varied without departing from the spirit and scope of the invention as defined by the appended claims.

We claim:

1. A polyester container comprising a body terminating in a large diameter mouth, said mouth having a diameter generally approaching the diameter of said body, said mouth being defined by a neck finish of the type for releasably receiving a closure, said neck finish being biaxially oriented, and said neck finish having a greater density than said body to provide a diameter reduction when the container is hot filled that is materially less than that of said body.

2. A polyester container according to claim 1 wherein when said container is filled with a hot fill at a temperature on the order of 212° F. said neck finish diameter reduction is on the order of 1% and less.

3. A polyester container according to claim 1 wherein said neck finish has a density on the order of 1.37 grams/cubic centimeter and above as compared to a density on the order of 1.36 grams/cubic centimeter and below for said body.

4. A polyester container according to claim 1 wherein said neck finish is strain and thermally crystallized and said body is strain crystallized only.

5. A polyester container according to claim 1 wherein said neck finish is strain and thermally crystallized and said body is strain crystallized only, said body having a crystallinity on the order of 22% and below and said neck finish having a crystallinity on the order of 30% and above.

6. A polyester container according to claim 4 wherein said neck finish is of semi-opaque crystallinity.

7. A polyester container according to claim 1 wherein said container is formed as part of an intermediate article, said intermediate article including an upper adapter element, and said shrink characteristics of said adapter element adjacent said neck finish being generally the same as that of said neck finish.

8. An intermediate article according to claim 7 wherein said adapter element has a band of semi-opaque crystallinity which includes said neck finish and an adjacent portion of said adapter element.

9. A method of forming a polyester container comprising a body terminating in a large diameter mouth, said mouth being defined by a neck finish of the type for releasably receiving a closure, said neck finish being biaxially oriented and having a diameter reduction when the container is hot filled that is materially less than that of said body, said method comprising the steps of providing a blow mold having a mold cavity defining a one piece intermediate article including said container and an adapter element, providing a preform of a size and shape to form said intermediate article within said mold cavity, heating said preform to a blow molding temperature, said heating including the heating of an intermediate band of said preform to a higher temperature than that of the remainder of said preform to provide in said preform a zone of semi-opaque crystallinity, axially elongating said preform during a blow molding of said preform in said cavity and thereby aligning said zone of semi-opaque crystallinity with that portion of said mold cavity which defines said neck finish and an adjacent portion of said adapter element.

10. A method according to claim 9 wherein said heating of said preform is effected by a plurality of separate heaters, and means are provided for heating said preform zone to a higher temperature than other portions of said preform.

11. A polyester container having a biaxially oriented neck finish, said neck finish having a higher degree of crystallinity than the body of the container, said container formed from a preform having a portion heat treated such that this portion becomes a zone of semi-opaque crystallinity, and said zone forming the neck finish of said container, such that hot fill shrinkage of the diameter of the neck finish is less than 1% at a filling temperature on the order of 212° F.

12. A polyester container according to claim 11 wherein said neck finish has a density on the order of 1.37 grams/cubic centimeter and above as compared to a density on the order of 1.36 grams/cubic centimeter and below for said body.

13. A polyester container according to claim 11 wherein said neck finish is strain and thermally crystallized and said body is strain crystallized only.

14. A polyester container according to claim 11 wherein said neck finish is strain and thermally crystallized and said body is strain crystallized only, said body having a crystallinity on the order of 22% and below and said neck finish having a crystallinity on the order of 30% and above.

15. A polyester container according to claim 13 wherein said neck finish is of semi-opaque crystallinity.

16. A polyester container according to claim 1 wherein said neck finish is of semi-opaque crystallinity.

17. A polyester container according to claim 11 wherein said body has a crystallinity on the order of 22% and below and said neck finish has a crystallinity on the order of 30% and above.

18. A polyester container according to claim 1 wherein said body has a crystallinity on the order of 22% and below and said neck finish has a crystallinity on the order of 30% and above.

* * * * *